A. HUPP.
SPRING SUPPORT FOR VEHICLES.
APPLICATION FILED FEB. 18, 1920.
1,410,313. Patented Mar. 21, 1922.
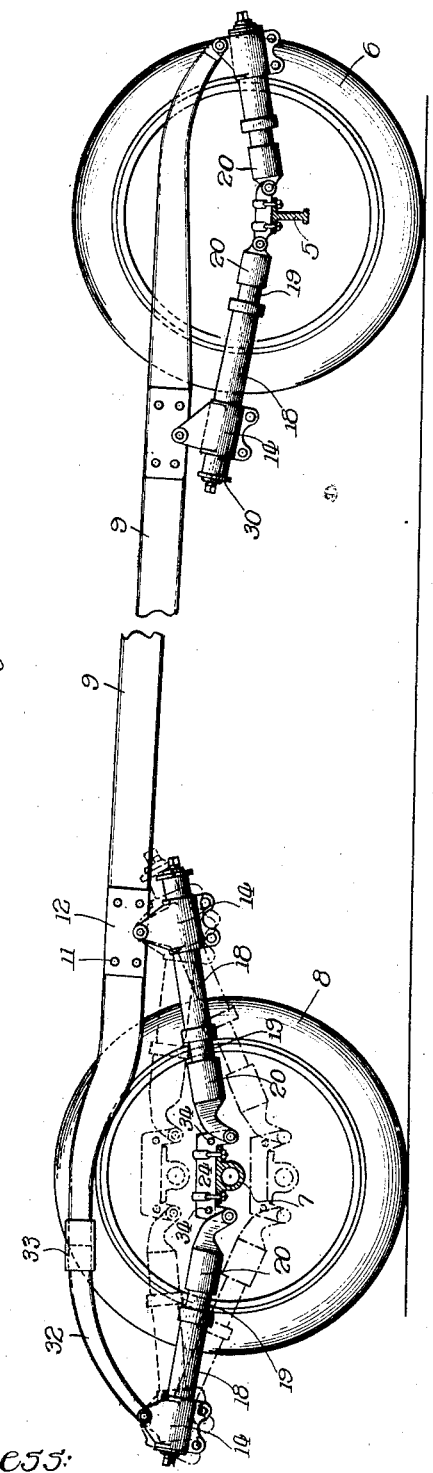
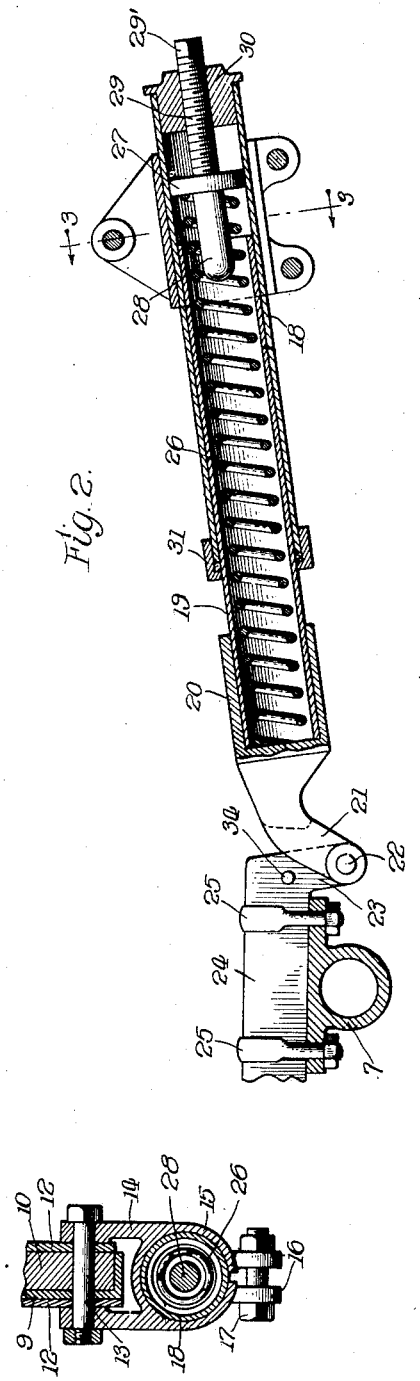
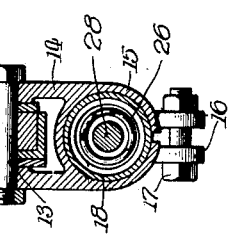
Inventor:
Albert Hupp,
By Pond & Wilson,
Attys.
Witness:
A. J. Sauser

UNITED STATES PATENT OFFICE.

ALBERT HUPP, OF OAK PARK, ILLINOIS.

SPRING SUPPORT FOR VEHICLES.

1,410,313. Specification of Letters Patent. Patented Mar. 21, 1922.

Application filed February 18, 1920. Serial No. 359,707.

*To all whom it may concern:*

Be it known that I, ALBERT HUPP, a citizen of the United States, residing at Oak Park, in the county of Cook and State of Illinois, have invented certain new and useful Improvements in Spring Supports for Vehicles, of which the following is a specification.

This invention pertains to devices for elastically supporting the body of a vehicle upon its running gear, and has reference in its chief intended application to automobiles, motor trucks, and similar power driven vehicles, although adapted for advantageous use on carriages and wagons and other horse power vehicles.

The chief object sought to be attained by the present invention is the provision of an improved elastic body support of a kind and character such as to effectively cushion and absorb the shocks, jolts and vibrations transmitted to the running gear by the more or less rough and irregular surface of the road, and especially by holes, ruts and obstacles of considerable size in or on the road surface.

Other important objects of the invention are—to provide an improved cushioning mechanism which may readily be substituted on existing motor vehicles for the usual semi-elliptic springs now extensively used, without necessitating any alteration of the vehicle structure; to provide a spring construction readily adaptable and adjustable to variations in the spacing of the spring shackle attachment on the side sill of chassis frames; to provide a construction permitting a longer range of up and down movement of the axles relatively to the chassis frame than is possible with the usual semi-elliptic springs, thereby affording easy riding qualities; to provide a construction wherein the stiffness of the spring element may be nicely regulated in accordance with the weight of the load, road conditions, etc.; to provide a construction possessing the general character and function of a shock absorber; and generally, to provide a simple, economical and highly efficient spring support for motor and other vehicles possessing a cushioning function of such superior efficiency as to render the use of pneumatic tires unnecessary, especially for motor trucks and like freight-carrying vehicles.

Other objects and advantages of the invention will be apparent to those skilled in the art from the following description, taken in connection with the accompanying drawing in which I have illustrated one practical embodiment of the principle of the invention, and wherein—

Fig. 1 is a side elevation partly broken out and in section of an automobile running gear and chassis frame embodying my present improvements;

Fig. 2 is an enlarged detail view in section of the rear axle and one of the endwise compressible toggle lever arms of the support; and, Fig. 3 is a cross section taken on the line 3—3 of Fig. 2.

Generally described, the device of the present invention comprises a pair of spring supports on each side of the vehicle between the side sill of the chassis frame and the front and rear axles, respectively, each of said spring supports embodying the principle of a toggle-lever having elastic endwise compressible and expansible arms, with the knuckle or joint of the lever at the axle, and the outer portions of the arms pivotally connected to the side sills on opposite sides of the axle respectively; the weight of the vehicle and its load tending to expand the toggle-lever through an endwise compressible action on the arms applied at the outer ends of the latter, and road obstructions also tending to expand the toggle-lever through a similar action on the arms applied at the knuckle or joint. The spring elements are housed within the lever arms, and means are provided for adjusting the tension of the spring elements in accordance with the load.

Referring to the drawing for a specific description of the structure and arrangement of the parts of the device, 5 designates the front axle of an automobile on which are mounted, as usual, the front wheel 6, and 7 designates the rear axle bridge or housing carrying the usual differential gear and live axle sections, to the outer ends of which latter are secured the usual rear traction wheels 8. The rectangular chassis frame may be of the usual construction, including longitudinal side sills 9, preferably of the customary channel shape as shown in Fig. 3. At some distance inwardly from each end of the side sill 9 there is fitted within the latter a hardwood block 10, as a filler; and to opposite sides of the sill and block 10 are secured by bolts 11 flat metal plates 12. Through these plates 12, the vertical web of the side sill 9 and the filler block 10, is passed a pivot bolt 13, from which is suspended a hanger bracket 14 having at its lower end a longitudinally split sleeve 15 formed with depending flanges or lugs 16 adapted to be drawn together by clamping bolts 17. In the split sleeve 15 is fitted a steel tube 18, this tube being tightly held by the sleeve 15 by means of the clamping bolts 17. Telescoping within the lower portion of the tube 18 is a steel tube 19, the lower end of which is tightly fitted into a cap-piece 20 that is formed at its outer end with a hinge lug 21 connected by a pivot bolt 22 to a similar pivot lug 23 formed on the inner side of a shackle block 24 that rests upon the rear axle bridge 7 and is secured to the latter by U-bolts 25. Housed within the telescoping tubular members 18 and 19 is a long powerful coil compression spring 26, the lower end of which abuts against the transverse wall of the cap 20, while its upper end bears against an adjustable abutment in the form of a plunger disc 27 slidably fitting the outer tubular member 18. The disc 27 is preferably provided with a mandrel 28 forming a core-piece or centering-piece for the upper end portion of the spring 26 which projects more or less into the outer tubular member 18. On the opposite side of the disc 27 is a threaded stem 29 that passes through a tapped hole in an end-piece or cap 30 formed integrally with or strongly secured to the outer end of the tubular member 18. The outer end of the stem 29 is squared, as shown at 29', for the application of a wrench, by which the tension of the spring 26 may be increased or decreased, as desired, according to load and road conditions.

To the lower end of the outer tubular member 18 is applied a gasket 31 for the exclusion of dust and dirt from the interior of the chamber which, in practice, is packed with oil to reduce wear between the outer and inner telescoping members and between the inner telescoping member and the spring.

Pivotally suspended from the rear end of the side sill 9 is a hanger bracket and toggle arm structure that is a duplicate of the structure above described turned end for end, with its lower end pivoted to a shackle block lug 23 on the rear side of the axle bridge. It will thus be seen that the complete assembly between the side sill and rear axle bridge on each side of the vehicle comprises essentially a toggle-lever having endwise compressible arms, the lower and inner ends of which are articulated to the axle, and the upper and outer ends of which are pivotally hung from the side sill at points on opposite sides of and equally remote from the axle.

The same construction of toggle-lever support is employed on each side of the vehicle between the side sill 9 and the front axle 5, except that in some cases the forward arm of the toggle-lever may be somewhat shorter than the rear arm where the length of the side sill may be such as to require a short lever arm at this place.

In the application of my present device to existing automobile constructions, the several hanger brackets 14 can be attached to the side sill, either with or without the employment of the filler blocks 10 and side plates 12, by and at the points occupied by the usual spring shackle bolts; while the shackle blocks 24 can be mounted on and secured to the axles by the same U-bolts or clips that are employed for securing the central portion of the usual semi-elliptic spring to the axle. The substitution of the present device for the usual semi-elliptic spring is, therefore, a very simple matter, requiring no special formations or alteration of existing structures. The telescopic lever arms may be made in a single uniform size and of sufficient length to take the place of the longest semi-elliptic springs in use; and, when substituted for shorter springs, the longitudinally split hanger brackets can be clamped upon the outer tubular members of the toggle-lever arms at points inwardly from the outer ends of the latter, as indicated in Figs. 1 and 2.

In constructions where the side sills of the chassis frame may not extend rearwardly sufficiently far to accommodate the present device, I provide extension pieces 32 and sleeves or ferrules 33 which may be brazed to the rear ends of such short side sills and to the extension members 32 in the manner indicated in Fig. 1, to carry the rearmost hangers 14 of the toggle-arms.

The described construction affords a longer yielding movement between the axle and the chassis frame resulting from encountering an obstacle or hole in the roadway than is possible with the standard spring constructions now in use. In Fig. 1, the full line position of the parts designates their relative position under an average load. The dotted line position of the parts indicates the maximum relative upward yield of the axle upon encountering a road obstruction or under a sudden downward thrust of the body, while the lower dot and dash line position indicates substantially the lowest point to which the axle may suddenly drop under the thrust of the spring before it is followed by the load when the wheel encounters a deep hole or other deep depression in the roadway. By reason of the great compression to which the springs are subjected as a result of the toggle-lever arrangement described, substantially the same cushioning effect is obtained that is secured in the case of extremely heavy vehicle bodies, which latter, as is well known, are less subjected to vibration than light bodies on account of their greater weight and slower responsiveness to forces disturbing their inertia. Moreover, the friction between the telescoping tubes of the lever arms retards the rebound of the springs, thus making the device function as a shock-absorber. Contact of the gland collars 31 with the outer ends of the caps 20 prevents the axle, on its relative upward movement from reaching or passing a dead center position; while the lowest position which the axle may assume relatively to the body is limited by contact of the hinge lugs 21 with stop lugs 34 on the pivot lugs 23 of the shackle-blocks, this latter also preventing accidental separation of the telescopic members of the toggle-arms.

The specific structure of endwise compressible toggle-lever arm herein shown and described is identical with a similar element shown, described and claimed in my copending application, Serial No. 341,235, filed Nov. 28, 1919, in which case I have shown and claimed a single spring support of a toggle-lever type between the intermediate portion of the side sill and the front and rear axles, in combination with a tie-rod connecting the axles and opposing the outward thrust of the lever arms.

I claim—

1. In a spring support for vehicles, the combination with a body supporting member, and an axle, of a toggle lever support between said member and axle comprising a pair of oppositely inclined toggle arms pivotally connected at their outer and upper ends to said member on opposite sides of said axle and pivotally connected at their inner and lower ends to said axle, each of said arms comprising a pair of telescoping tubes closed at their outer ends, and a compression coil spring housed within said tubes.

2. In a spring support for vehicles, the combination with a side sill of a chassis frame, and an axle, of hanger brackets pivotally suspended at their upper ends from said side sill on opposite sides respectively of said axle, and a pair of endwise elastically compressible toggle-arms rigidly held at their outer ends in said brackets and at their inner ends pivotally jointed to said axle.

3. In a spring support for vehicles, the combination with a side sill of a chassis frame, and an axle, of hanger brackets pivotally suspended at their upper ends from said side sill on opposite sides respectively of said axle, a pair of endwise elastically compressible toggle-arms, means for rigidly securing the outer end portions of said toggle arms to said brackets in any desired position lengthwise of said arms, and means for pivotally jointing the inner ends of said arms to said axle.

4. In a spring support for vehicles, the combination with a side sill of a chassis frame, and an axle, of hanger brackets pivotally suspended at their upper ends from said side sill on opposite sides of said axle respectively and formed with longitudinally split sleeves, tubular members mounted in said sleeves, means for clamping said sleeves on said tubular members, other tubular members telescopingly engaged with said first named tubular members and pivotally jointed at their lower ends to said axle, and compression springs housed within said tubular members.

5. In a spring support for vehicles, the combination of a side sill of a chassis frame, an axle, hanger brackets pivotally suspended from said side sill on opposite sides of said axle respectively, a shackle block rigidly attached to said axle, and a pair of endwise elastically compressible toggle arms at their upper ends mounted in said brackets and at their lower ends pivoted on said shackle block.

6. In a spring support for vehicles, the combination of a side sill of a chassis frame, a rear axle, an extension member secured to the rear end of said side sill, a hanger bracket pivotally hung from the rear end of said extension member, another hanger bracket pivotally hung from said side sill forwardly of said rear axle, and a pair of endwise elastically compressible toggle arms at their upper ends mounted in said brackets and at their lower ends pivotally jointed to said rear axle.

7. In a spring support for vehicles, the combination of a side sill of a chassis frame, a rear axle, an outwardly and downwardly curved extension member secured to the rear end of said side sill, a hanger bracket pivotally hung from the rear end of said extension member, another hanger bracket pivotally hung from said side sill forwardly of said rear axle, a shackle block rigidly attached to said axle, and a pair of endwise elastically compressible toggle arms at their upper ends mounted in said brackets and at their lower ends pivoted on said shackle block.

ALBERT HUPP.